US012782544B2

(12) United States Patent
Lim

(10) Patent No.: US 12,782,544 B2
(45) Date of Patent: Nov. 3, 2026

(54) APPARATUS AND METHOD FOR SETTING A UWB RANGING PERIOD

(71) Applicant: HYUNDAI MOBIS CO., LTD., Seoul (KR)

(72) Inventor: Jong Chul Lim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 544 days.

(21) Appl. No.: 18/089,180

(22) Filed: Dec. 27, 2022

(65) Prior Publication Data

US 2023/0333240 A1 Oct. 19, 2023

(30) Foreign Application Priority Data

Apr. 14, 2022 (KR) ........................ 10-2022-0046550

(51) Int. Cl.

*G01S 13/76* (2006.01)

*B60R 25/24* (2013.01)

(52) U.S. Cl.

CPC ............ *G01S 13/767* (2013.01); *B60R 25/24* (2013.01)

(58) Field of Classification Search

CPC ...... G01S 13/767; G01S 7/003; G01S 13/765; H04W 84/18; H04W 64/00; H04W 4/80; B60R 25/245; B60R 25/01; B60R 25/10; B60R 2325/101; B60R 25/00–24; G07C 9/00–9/30

USPC .................. 342/125, 42–51; 340/5.61–5.74; 455/41.1–41.3

See application file for complete search history.

(56) References Cited

U.S. PATENT DOCUMENTS

| | | | | |
|---|---|---|---|---|
| 2019/0135229 A1* | 5/2019 | Ledvina | ................ | H04W 12/64 |
| 2022/0070613 A1* | 3/2022 | Barton | .................. | G01S 5/0236 |
| 2022/0082676 A1 | 3/2022 | Lee et al. | | |
| 2022/0242369 A1* | 8/2022 | Qiao | ..................... | B60R 25/209 |
| 2023/0231591 A1* | 7/2023 | Russell | ................. | H04W 4/023 |

FOREIGN PATENT DOCUMENTS

| | | | | |
|---|---|---|---|---|
| CN | 112995948 A | 6/2021 | | |
| KR | 10-2021-0137841 A | 11/2021 | | |
| KR | 102354119 B1 * | 1/2022 | ......... | G01S 13/0209 |

OTHER PUBLICATIONS

Korean Office Action issued on Aug. 21, 2026, in counterpart Korean Patent Application No. 10-2022-0046550 (6 pages in English, 6 pages in Korean). No effect on Allowance.

* cited by examiner

*Primary Examiner* — Resha Desai

*Assistant Examiner* — Remash R Guyah

(74) *Attorney, Agent, or Firm* — NSIP Law

(57) ABSTRACT

An apparatus for setting an ultra-wide band (UWB) ranging period including a Bluetooth low energy (BLE) communication unit configured to transmit and receive data to and from multiple digital keys, a UWB communication unit configured to provide information on separation distances between the multiple digital keys and a vehicle, a memory configured to store one or more instructions, and one or more processors configured to execute the one or more instructions to perform a ranging based on the separation distances between the multiple digital keys and the vehicle and setting ranging periods for the multiple digital keys, respectively, based on signal intensities of received data of the multiple digital keys, the received data being received from the BLE communication unit.

12 Claims, 4 Drawing Sheets

APPARATUS AND METHOD FOR SETTING A UWB RANGING PERIOD

CROSS-REFERENCE TO RELATED APPLICATION

This application claims the benefit under 35 USC § 119 (a) of Korean Patent Application No. 10-2022-0046550, filed on Apr. 14, 2022, in the Korean Intellectual Property Office, the entire disclosure of which is incorporated herein by reference for all purposes.

BACKGROUND

1. Field

The present disclosure relates to an apparatus and method for setting an ultra wide band (UWB) ranging period, and more particularly, to an apparatus and method for setting a UWB ranging period.

2. Description of the Related Art

In general, a smart key system (SMK system) determines the location of an Fob (smart key) by using low frequency (LF, 125 kHz) and radio frequency (RF, 434 MHz) technologies, controls the locking/unlocking of a vehicle door, and starts the engine of the vehicle.

In order to provide a local based service (LBS), a technology, such as GPS, Wi-Fi, or Bluetooth, is used. The technology has a problem in that precise measurement is difficult, whereas a UWB (a bandwidth of 6 to 8 GHZ, 500 MHz or more) has an advantage in that positioning is possible in a wide frequency band with high accuracy within several tens of centimeters by using low energy communication.

In this case, the UWB is a technology for calculating the distance between the subjects of communication by multiplying a signal arrival time between the subjects of communication by the speed of light by using a time of flight (ToF) technology.

Conventional positioning technologies based on a GPS and a mobile communication network have error ranges of 5 to 50 m and 50 to 200 m, respectively. In the case of the GPS, an obstacle may occur in the city's forest of buildings when a signal that is transmitted by a satellite arrives at the GPS.

In this case, Wi-Fi is capable of location tracking at low costs, but may have limitations to the division of a channel if the number of location tracking targets is increased because a use frequency band is narrow. Furthermore, a terminal having mobility may be disconnected from a fixed Wi-Fi access point (AP).

In Bluetooth, multiple sensors may be disposed at low costs. However, Bluetooth is not suitable for tracking a location in real time in a dynamic environment because communication latency is great.

In contrast, the UWB uses a wide frequency band unlike Wi-Fi and Bluetooth, and can transmit a large amount of information at a high transmission speed with low power.

Positioning using the UWB technology shows a low error ratio of about 20 centimeters, and the UWB technology has advantages in that it has high transmissivity for obstacles and is not influenced by another signal such as Wi-Fi.

In this case, a behavior of measuring the distance between a digital key and an anchor by using the UWB technology is called ranging. In this case, a data structure complies with the IEEE802.15.4z standard, and it takes about 200 μs for the data structure to transmit 1 packet. Furthermore, a slot is defined as the time that is taken up to next transmission (or reception) after the digital key or the anchor transmits (or receives) a signal once.

If ranging with a digital key is performed based on a block when the ranging is performed by using the UWB technology as described above, the ranging is performed once while the ranging is repeated by 96 ms for each block.

In this case, ranging between one vehicle and multiple digital keys is called multi-ranging. A maximum of four types of ranging are simultaneously performed so far.

However, if multi-ranging is performed as described above, there is a problem in that the probability that a ranging fail may occur is increased because channels become complicated and pieces of timing overlap when many digital keys perform ranging within a short time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided an apparatus for setting an ultra-wide band (UWB) ranging period, the apparatus including a Bluetooth low energy (BLE) communication unit configured to transmit and receive data to and from multiple digital keys, a UWB communication unit configured to provide information on separation distances between the multiple digital keys and a vehicle, a memory configured to store one or more instructions, and one or more processors configured to execute the one or more instructions to perform a ranging based on the separation distances between the multiple digital keys and the vehicle and setting ranging periods for the multiple digital keys, respectively, based on signal intensities of received data of the multiple digital keys, the received data being received from the BLE communication unit.

The signal intensities of the received data may include one or more received intensities of one or more BLE signals.

The instructions may also include setting a ranging grade for each of the multiple digital keys based on the signal intensities of the received data.

The ranging period may be set as a multiple based on the ranging grade.

The instructions may also include setting a shorter ranging period as the signal intensities of the received data becomes greater.

In another general aspect, here is also provided a method of setting an ultra-wide band (UWB) ranging period, the method including receiving, by a processor, signal intensities of received data received from multiple digital keys from a Bluetooth low energy (BLE) communication unit, setting, by the processor, ranging periods for the multiple digital keys, respectively, based on the signal intensities of the received data, and performing, by the processor, a ranging with the multiple digital keys based on the ranging periods.

The signal intensities of the received data may include received intensities of one or more BLE signals.

The method may also include, in the setting of the ranging period, setting a ranging grade for each of the multiple digital keys based on the signal intensities of the received data.

The ranging period may be set as a multiple based on the ranging grade.

Figure 1:
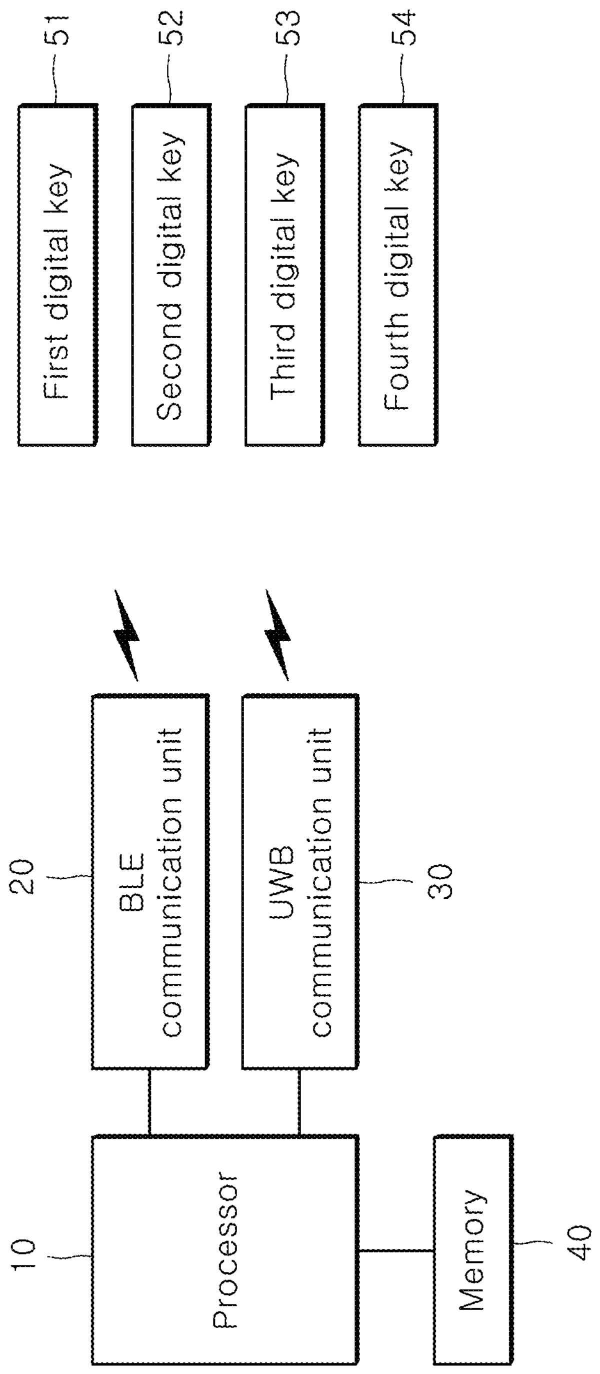
FIG. 1 is a block diagram illustrating an apparatus for setting a UWB ranging period according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF THE ILLUSTRATED EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
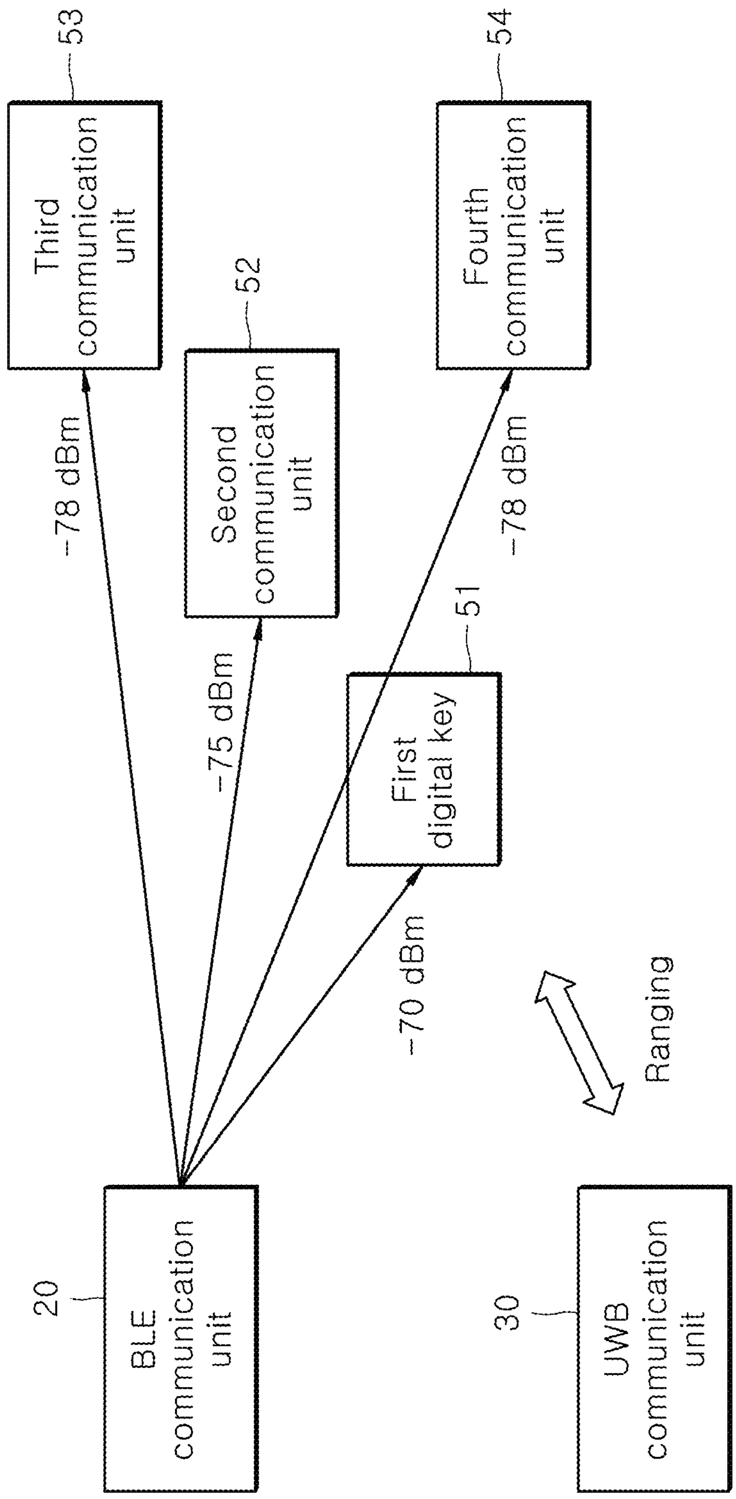
FIG. 2 is an exemplary diagram illustrating the received intensity of a BLE signal of a digital key in the apparatus for setting a UWB ranging period according to an embodiment of the present disclosure.
Figure 3:
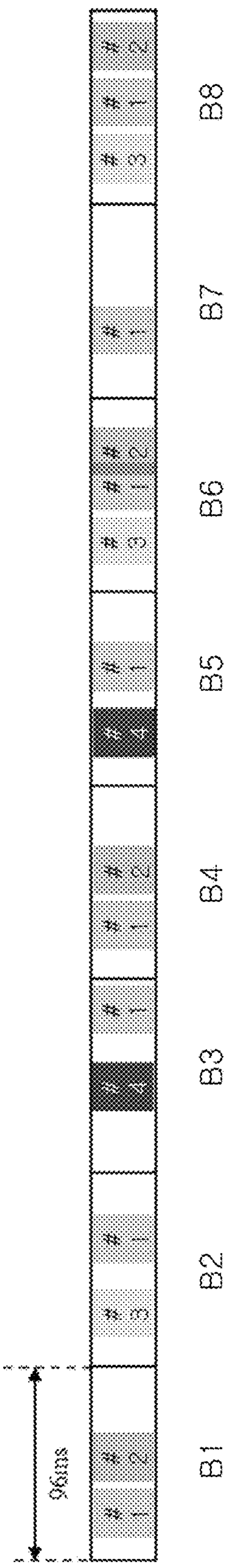
FIG. 3 is a time grid illustrating a ranging period based on a block in the apparatus for setting a UWB ranging period according to an embodiment of the present disclosure.

FIG. 1 is a block diagram illustrating an apparatus for setting a UWB ranging period according to an embodiment of the present disclosure. FIG. 2 is an exemplary diagram illustrating the received intensity of a BLE signal of a digital key in the apparatus for setting a UWB ranging period according to an embodiment of the present disclosure. FIG. 3 is a time grid illustrating a ranging period based on a block in the apparatus for setting a UWB ranging period according to an embodiment of the present disclosure.

The apparatus for setting a UWB ranging period according to an embodiment of the present disclosure, which is illustrated in FIG. 1, may include a Bluetooth low energy (BLE) communication unit 20, a UWB communication unit 30, memory 40, and a processor 10.

The BLE communication unit 20 may provide the signal intensities of received data of first to fourth digital keys 51 to 54 by transmitting and receiving data to and from the first to fourth digital keys 51 to 54 based on BLE communication. The BLE communication unit 20 may be implemented by using a Bluetooth module capable of performing Bluetooth communication, including a transceiver.

That is, the signal intensity of the received data that is provided by the BLE communication unit 20 is the received intensity of a BLE signal.

In the present embodiment, a case in which UWB multi-ranging is performed based on the four digital keys has been described as an example, but UWB multi-ranging may be performed by being paired with n digital keys.

The UWB communication unit 30 may provide information on separation distances between the first to fourth digital keys 51 to 54 and a vehicle while communicating with the first to fourth digital keys 51 to 54 based on a UWB communication technology. The UWB communication unit 30 may be implemented by using a UWB module capable of performing UWB communication, including a transceiver.

In this case, the UWB communication unit 30 may provide information on the separation distances between the first to fourth digital keys 51 to 54 and the vehicle while communicating with the first to fourth digital keys 51 to 54 through multiple anchors that are installed at multiple places of the vehicle.

A program for performing ranging is embedded in the memory 40.

In this case, the memory 40 may store ranging periods that are set in the first to fourth digital keys 51 to 54.

The processor 10 may perform ranging based on the separation distances between the first to fourth digital keys 51 to 54 and the vehicle by executing the program stored in the memory 40.

In this case, the processor 10 may perform the ranging by setting the ranging periods for the first to fourth digital keys 51 to 54, respectively, based on the signal intensities of received data of the first to fourth digital keys 51 to 54, which are received through the BLE communication unit 20.

In this case, the processor 10 may set a ranging grade based on the signal intensity of the received data, and may set the ranging period as a multiple based on the ranging grade.

That is, the greater the signal intensity of the received data is, the shorter the ranging period may be set.

For example, as illustrated in FIG. 2, assuming that BLE received signal strength indicators (RSSIs), that is, the intensities of BLE signals of the first to fourth digital keys 51 to 54 that transmit and receive data to and from the BLE communication unit 20, are −70 dBm, −75 dBm, −78 dBm, and −78 dBm, respectively, each of ranging grades for the first to fourth digital keys 51 to 54 may be set as a first grade to a third grade, as illustrated in Table 1. A ranging period for each of the first to fourth digital keys 51 to 54 may be set as a multiple based on each grade.

TABLE 1

| DK ID | BLE RSSI | Ranging grade | Ranging period |
|---|---|---|---|
| #1 | −70 dBm | 1$^{st}$ grade (−70 dBm or higher) | 96 ms (=96 × 1) |
| #2 | −75 dBm | 2$^{nd}$ grade (−75 dBm or higher, less than −70 dBm) | 192 ms (=96 × 2) |
| #3 | −78 dBm | 3$^{rd}$ grade (−80 dBm or higher, less than −75 dBm) | 288 ms (=96 × 3) |
| #4 | −78 dBm | 3$^{th}$ grade (−80 dBm or higher, less than −75 dBm) | 288 ms (=96 × 3) |

Accordingly, the ranging periods may be set in the first to fourth digital keys 51 to 54, respectively, by setting the first grade for the first digital key (#1) 51, the second grade for the second digital key (#2) 52, and the third grade for the third digital key (#3) 53 and the fourth digital key (#4) 54.

A UWB block-based ranging period is 98 ms according to the International Standard Technical Specification. Accordingly, after each grade is set as described above, the ranging period of the first grade may be set as 98 ms, the ranging period of the second grade may be set as 192 ms, that is, a multiple of two, and the ranging period of the third grade may be set as 288 ms, that is, a multiple of three, based on the UWB block-based ranging period of 98 ms.

After the UWB ranging periods are set as described above, the processor 10 may perform ranging based on separation distances between the first to fourth digital keys 51 to 54 and the vehicle, which are measured through the UWB communication unit 30.

That is, as illustrated in FIG. 3, the processor 10 may perform ranging with the first digital key (#1) 51 by hopping every 98 ms, that is, each block, and may perform ranging with the second digital key (#2) 52 by hopping every 192 ms, that is, two blocks.

As described above, a user's approach intention may be checked based on the received intensity of a BLE signal, and a digital key having a high intention of use may be preferentially ranged.

As described above, according to the apparatus for setting a UWB ranging period according to an embodiment of the present disclosure, when UWB multi-ranging with multiple digital keys is performed, the UWB multi-ranging is performed by setting ranging periods for the multiple digital keys, respectively, based on the received intensities of BLE signals of the multiple digital keys. Accordingly, by preferentially measuring a ranging target and a location of the ranging target based on a faster ranging period as a user's approach intention is higher, efficient user convenience can be provided and a ranging fail and power consumption can be minimized by minimizing unnecessary ranging.

In the present embodiment, the processor may be an electronic control unit (ECU) or a micro controller unit (MCU) that is provided in a vehicle.

Figure 4:
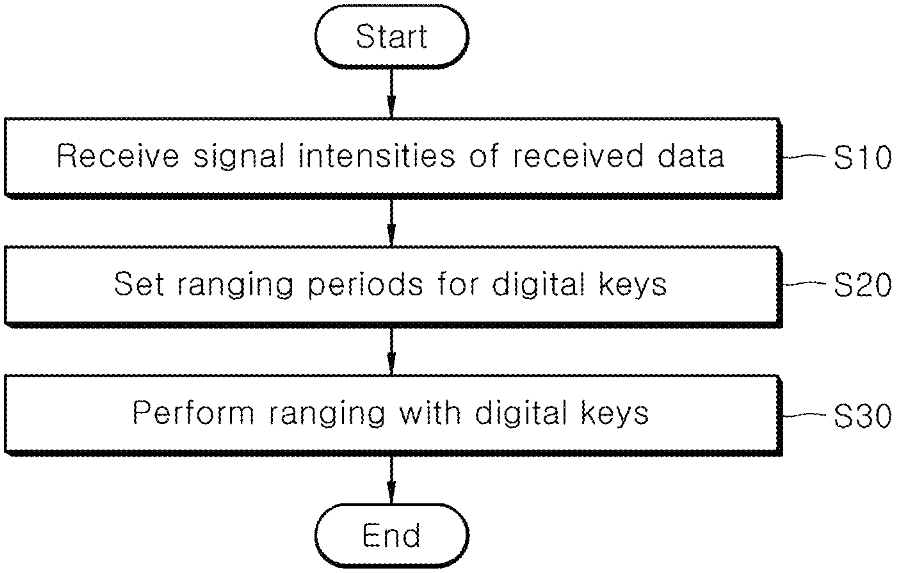
FIG. 4 is a flowchart for describing a method of setting a UWB ranging period according to an embodiment of the present disclosure.

FIG. 4 is a flowchart for describing a method of setting a UWB ranging period according to an embodiment of the present disclosure.

As illustrated in FIG. 4, in the method of setting a UWB ranging period according to an embodiment of the present disclosure, first, the processor 10 receives, from the BLE communication unit 20, the signal intensities of received data received from the first to fourth digital keys 51 to 54 (S10).

In this case, the BLE communication unit 20 may provide the signal intensity of the received data by transmitting and receiving data to and from the first to fourth digital keys 51 to 54 based on BLE communication.

That is, the signal intensity of the received data that is provided by the BLE communication unit 20 is the received intensity of a BLE signal.

After receiving the signal intensities of the received data of the first to fourth digital keys 51 to 54 in step S10, the processor 10 sets ranging periods for the first to fourth digital keys 51 to 54, respectively, based on the signal intensities of the received data (S20).

That is, the greater the signal intensity of the received data is, the shorter the ranging period may be set.

For example, as illustrated in FIG. 2, assuming that BLE received signal strength indicators (RSSIs), that is, the intensities of BLE signals of the first to fourth digital keys 51 to 54 that transmit and receive data to and from the BLE communication unit 20, are −70 dBm, −75 dBm, −78 dBm, and −78 dBm, respectively, each of ranging grades for the first to fourth digital keys 51 to 54 may be set as a first grade to a third grade, as illustrated in Table 1. A ranging period for each of the first to fourth digital keys 51 to 54 may be set as a multiple based on each grade.

Accordingly, the ranging periods may be set in the first to fourth digital keys 51 to 54, respectively, by setting the first grade for the first digital key (#1) 51, the second grade for the second digital key (#2) 52, and the third grade for the third digital key (#3) 53 and the fourth digital key (#4) 54.

A UWB block-based ranging period is 98 ms according to the International Standard Technical Specification. Accordingly, after each grade is set as described above, the ranging period of the first grade may be set as 98 ms, the ranging period of the second grade may be set as 192 ms, that is, a multiple of two, and the ranging period of the third grade may be set as 288 ms, that is, a multiple of three, based on the UWB block-based ranging period of 98 ms.

After setting the ranging periods for the first to fourth digital keys 51 to 54 in step S20, the processor 10 performs ranging with the first to fourth digital keys 51 to 54 based on the ranging periods (S30).

That is, as illustrated in FIG. 3, the processor 10 may perform ranging with the first digital key (#1) 51 by hopping every 98 ms, that is, each block, and may perform ranging with the second digital key (#2) 52 by hopping every 192 ms, that is, two blocks.

As described above, a user's approach intention may be checked based on the received intensity of a BLE signal, and a digital key having a high intention of use may be preferentially ranged.

As described above, according to the method for setting a UWB ranging period according to an embodiment of the present disclosure, when UWB multi-ranging with multiple digital keys is performed, the UWB multi-ranging is performed by setting ranging periods in the multiple digital keys, respectively, based on the received intensities of BLE signals of the multiple digital keys. Accordingly, by preferentially measuring a ranging target and a location of the ranging target through a faster ranging period as a user's approach intention is higher, efficient user convenience can be provided and a ranging fail and power consumption can be minimized by minimizing unnecessary ranging.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for setting an ultra-wide band (UWB) ranging period, the apparatus comprising:

a Bluetooth low energy (BLE) communication unit configured to transmit and receive data to and from multiple digital keys;

a UWB communication unit configured to provide information on separation distances between the multiple digital keys and a vehicle;

a memory configured to store one or more instructions; and one or more processors configured to execute the one or more instructions to:

receive, for each digital key, a received intensity of a BLE signal of that key from the BLE communication unit;

set, for each digital key, a ranging grade from the received BLE signal intensity;

set a ranging period for each digital key as an integer multiple of a common UWB block period used for all of the digital keys; and perform concurrent multi-ranging in a time grid aligned to the common UWB block period, assigning for each digital key a phase offset such that ranging hops of different digital keys do not overlap, wherein a greater BLE signal intensity for a digital key results in selection of a smaller integer multiple for that digital key;

wherein each ranging grade is selected from a plurality of predetermined ranging grades, each ranging grade defined by a respective BLE signal intensity range bounded by predetermined RSSI thresholds and mapped to a respective integer multiplier.

2. The apparatus of claim 1, wherein the signal intensities of the received data comprise one or more received intensities of one or more BLE signals.

3. The apparatus of claim 1, wherein the one or more processors are further configured to set the ranging grade for each digital key from the BLE signal intensity.

4. The apparatus of claim 3, wherein the ranging period is set as the integer multiple of the common UWB blocked period based on the ranging grade.

5. The apparatus of claim 1, wherein a greater received intensity of a BLE signal results in a shorter ranging period for the corresponding digital key.

6. The apparatus of claim 1, wherein the common UWB block period comprises a UWB block-based ranging period, and wherein setting the ranging period for each digital key comprises setting the ranging period to be a multiple of the UWB block-based ranging period, the multiple being an integer.

7. A method of setting an ultra-wide band (UWB) ranging period, the method comprising:

receiving, by a processor, for each of multiple digital keys, received intensities of Bluetooth low energy (BLE) signals from a BLE communication unit;

setting, by the processor and for each digital key, a ranging grade from the received BLE signal intensity;

setting, by the processor, a ranging period for each digital key as an integer multiple of a common UWB block period used for all of the digital keys; and performing, by the processor, concurrent multi-ranging in a time grid aligned to the common UWB block period, assigning for each digital key a phase offset such that ranging hops of different digital keys do not overlap, wherein a greater BLE signal intensity for a given digital key results in selection of a smaller integer multiple for that digital key;

wherein each ranging grade is selected from a plurality of predetermined ranging grades, each ranging grade defined by a respective BLE signal intensity range bounded by predetermined RSSI thresholds and mapped to a respective integer multiplier.

8. The method of claim 7, wherein the signal intensities of the received data comprise received intensities of one or more BLE signals.

9. The method of claim 7, further comprising setting, for each digital key, the ranging grade from the BLE signal intensity.

10. The method of claim 9, wherein the ranging period is set as the integer multiple of the common UWB block period based on the ranging grade.

11. The method of claim 7, wherein a greater received intensity of a BLE signal results in a shorter ranging period for the corresponding digital key.

12. The method of claim 7, wherein the common UWB block period comprises a UWB block-based ranging period, and wherein setting the ranging period for each digital key comprises setting the ranging period to be a multiple of the UWB block-based ranging period, the multiple being an integer.

* * * * *